(12) United States Patent
Surcouf et al.

(10) Patent No.: US 10,313,415 B2
(45) Date of Patent: Jun. 4, 2019

(54) USING SEGMENT ROUTING TO ACCESS CHUNKS OF CONTENT

(71) Applicants: Andre Surcouf, Saint Leu la Foret (FR); William Mark Townsley, Paris (FR); Thierry Gruszka, Le Raincy (FR)

(72) Inventors: Andre Surcouf, Saint Leu la Foret (FR); William Mark Townsley, Paris (FR); Thierry Gruszka, Le Raincy (FR)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 14/640,634

(22) Filed: Mar. 6, 2015

(65) Prior Publication Data
US 2016/0021162 A1 Jan. 21, 2016

Related U.S. Application Data

(60) Provisional application No. 62/026,413, filed on Jul. 18, 2014.

(51) Int. Cl.
*G06F 15/16* (2006.01)
*H04L 29/06* (2006.01)
(Continued)

(52) U.S. Cl.
CPC ............ *H04L 65/602* (2013.01); *G06F 16/00* (2019.01); *G06F 16/955* (2019.01); *H04L 45/74* (2013.01);
(Continued)

(58) Field of Classification Search
CPC ... H04L 65/602; G06F 17/30; G06F 17/30876
(Continued)

(56) References Cited

U.S. PATENT DOCUMENTS 6,587,438 B1 * 7/2003 Brendel ................ H04L 1/1858
370/238
8,739,272 B1 5/2014 Cooper et al.
(Continued)

OTHER PUBLICATIONS

Previdi et al.; "IS-IS Extensions for Segment Routing"; IETF StandardWorkingDraft, ISOC, XP015099634; Jun. 18, 2014; pp. 1-32; draft-ietf-isis-segment-routing-extensions-02.txt.
(Continued)

*Primary Examiner* — Oleg Survillo
*Assistant Examiner* — Tan Doan
(74) *Attorney, Agent, or Firm* — P. Su

(57) ABSTRACT

According to one aspect, a method includes obtaining a packet at a network endpoint from a client via a first segment. The packet has a segment routing header that includes a list of addresses attached to a chunk entry, and is configured to identify at least a first chunk requested by the client. The method also includes identifying, at the network endpoint, the at least first chunk using the packet, and determining at the network endpoint if the network endpoint has the first chunk. If it is determined that the network endpoint has the first chunk, the first chunk is provided from the network endpoint to the client. Alternatively, if it is determined that the network endpoint does not have the first chunk, the packet is provided to a second segment.

10 Claims, 7 Drawing Sheets

(51) Int. Cl.

| | |
|---|---|
| *G06F 16/00* | (2019.01) |
| *G06F 16/955* | (2019.01) |
| *H04N 21/238* | (2011.01) |
| *H04N 21/2381* | (2011.01) |
| *H04N 21/239* | (2011.01) |
| *H04N 21/2662* | (2011.01) |
| *H04N 21/61* | (2011.01) |
| *H04N 21/262* | (2011.01) |
| *H04N 21/658* | (2011.01) |
| *H04N 21/845* | (2011.01) |
| *H04L 12/741* | (2013.01) |
| *H04L 12/725* | (2013.01) |

(52) U.S. Cl.
CPC ........ *H04L 65/4084* (2013.01); *H04L 65/601* (2013.01); *H04N 21/238* (2013.01); *H04N 21/2381* (2013.01); *H04N 21/2393* (2013.01); *H04N 21/2662* (2013.01); *H04N 21/26258* (2013.01); *H04N 21/6125* (2013.01); *H04N 21/6581* (2013.01); *H04N 21/8456* (2013.01); *H04L 45/306* (2013.01)

(58) Field of Classification Search
USPC ......................................................... 709/219
See application file for complete search history.

(56) References Cited

U.S. PATENT DOCUMENTS

| | | | | |
|---|---|---|---|---|
| 2006/0262793 | A1* | 11/2006 | Vare ...................... | H04H 20/22 370/390 |
| 2008/0065699 | A1* | 3/2008 | Bloebaum ......... | G06F 17/30545 |
| 2008/0159288 | A1* | 7/2008 | Nagarajan ............... | H04L 45/10 370/392 |
| 2012/0259994 | A1 | 10/2012 | Gillies et al. | |
| 2014/0098675 | A1 | 4/2014 | Frost et al. | |
| 2014/0164552 | A1* | 6/2014 | Kim .................... | H04L 67/2842 709/214 |
| 2014/0169370 | A1 | 6/2014 | Filsfils et al. | |
| 2014/0269727 | A1 | 9/2014 | Filsfils et al. | |
| 2017/0026286 | A1* | 1/2017 | Surcouf ................ | H04L 45/742 |

OTHER PUBLICATIONS

Filsfils et al.; "Segment Routing Architecture"; IETF StandardWorkingDraft, ISOC, XP015100062; Jul. 3, 2014; pp. 1-18; draft-filsfils-spring-segment-routing-04.txt.

Cai et al.; "Evolve carrier ethernet architecture with SDN and segment routing"; IEEE Proceedings, XP032656361; Jun. 19, 2014; pp. 1-6; Procceding of IEEE International.

Filsfils et al.; "Segment Routing Use Cases"; IETF StandardWorkingDraft, ISOC, XP015098406; Mar. 27, 2014; pp. 1-36; draft-filsfils-spring-segment-routing-use-cases-00.txt.

Previdi et al.; IPv6 Segment Routing Header (SRH); Network Working Group Internet-Draft; Jan. 12, 2015; tools.ietf.org/pdf/draft-previdi-6man-segment-routing-header-05.pdf.

Martin et al.; IPv6 Segment Routing Use Cases; Network Working Group Internet-Draft; Mar. 6, 2014; tools.ietf.org/pdf/draft-martin-spring-segment-routing-ipv6-use-cases-00.pdf.

\* cited by examiner

USING SEGMENT ROUTING TO ACCESS CHUNKS OF CONTENT

CROSS REFERENCE TO RELATED APPLICATION

This application claims the benefit of U.S. Provisional Patent Application No. 62/026,413, filed Jul. 18, 2014 and entitled "Using Segment Routing to Access Chunks of Content," which is incorporated herein by reference in its entirety.

TECHNICAL FIELD

The disclosure relates generally to delivering content within networks. More particularly, the disclosure relates to using segment routing to access chunks of content in a network.

BACKGROUND

Video delivery is typically performed by a set of servers on which video in the form of chunks is stored. When a client requests video, the client may connect to the servers and may obtain the chunks from the servers until the video is completed. The client may open multiple connections to substantially all servers that contain different chunks of a video. Obtaining video through multiple connections is not efficient, and generally utilizes significant network resources.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
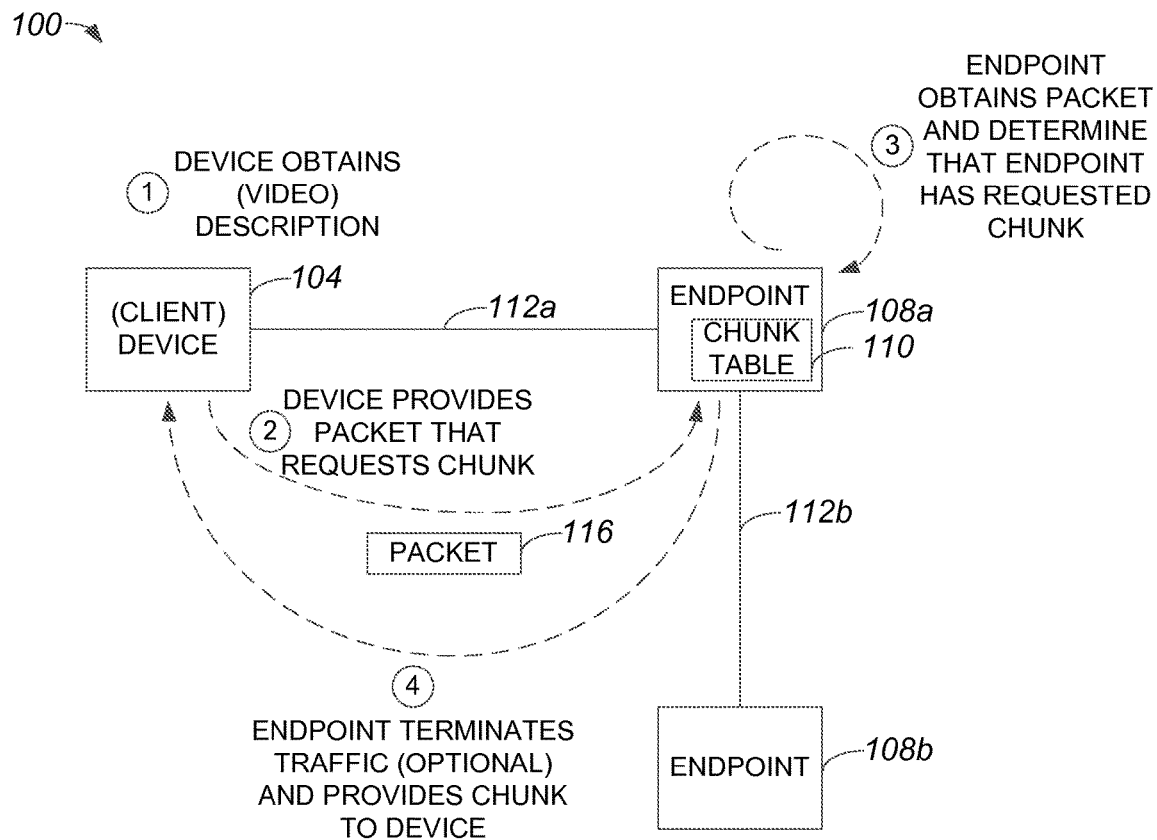
FIG. 1 is a diagrammatic representation of a network in which segment routing may be used to access chunks of content, e.g., video content, in accordance with an embodiment.

In one embodiment, a method includes obtaining a packet at a network endpoint, the packet being obtained from a client via a first segment, the packet having a segment routing header, the segment routing header including a list of addresses attached to a chunk entry, wherein the packet is configured to identify at least a first chunk requested by the client. The method also includes identifying, at the network endpoint, the at least first chunk using the packet, and determining at the network endpoint if the network endpoint has the first chunk. If it is determined that the network endpoint has the first chunk, the first chunk is provided from the network endpoint to the client. Alternatively, if it is determined that the network endpoint does not have the first chunk, the packet is provided to a second segment, and so on.

Description

Common content streaming systems typically utilize web protocols, as for example a hypertext transport protocol (HTTP), that operates at substantially all application layers. As common content streaming systems rely on Domain Name Service (DNS) and HTTP, Transmission Control Protocol (TCP), and/or Internet Protocol (IP), technical tradeoffs and limitations may result in compromising the quality of streaming content. Common content streaming systems include, but are not limited to including, video streaming systems and audio streaming systems.

Segment Routing (SR) protocol architectures generally allow a shift from substantially centralized delivery of substantially any kind of data or content, e.g., streaming video, and single-point fetching to a data-centric object fetch approach at an inter-networking layer. As a result, more efficient data streaming systems may be designed and applied to video content. When SR is used to enable video stored on servers to be provided to a client, a single connection may be opened and a network may handle the process of accessing video.

In one embodiment, properties of a SR architecture may be utilized to achieve a relatively simple, relatively high efficiency, and scalable streaming video system. The integration of SR allows a delivery process that is substantially automatic, highly accurate, and resilient. The ability to provide a delivery process that is substantially automatic, highly accurate, and resilient is possible because the SR may encode multiple locations for content, while the streaming video system may route the content to a correct location substantially without a host needing to know.

It should be appreciated that, herein and after, a video segment that is referenced, as for example by a Universal Record Locator (URL), may be referred to as a "chunk" or a "video chunk." In addition, a segment in SR may be referred to as a "segment." Further, it should be understood that while a chunk may be a video segment, a chunk may also be an audio segment, an audio and video (AV) segment, or a segment of any content.

In order to play content such as video on a device, e.g., a set-top box or a computer system or a tablet, the device may request the video from a server that is aware of the video, e.g., a Content Delivery Network (CDN). The request for video may specify a list of chunks which effectively make up the video. A video may be divided into short chunks that are each a few seconds in length. Generally, a response to a request for video may include a description of the video. The description of the video may be sent back to, or otherwise provided to, the device. Once the device obtains the description of the video, the device may play the video by fetching or retrieving a first chunk in the list. Although the video chunks may be referenced or played by Dynamic Adaptive Streaming over HTTP (DASH), any suitable method and/or apparatus may be used to reference video chunks.

In one embodiment, CDN may effectively be replaced by a network, or a combination of routers and servers. The combination of routers and servers may include a combination of client devices software stacks, leveraging on SR routing kernel support, and features that routes supporting SR may have. Video content, or chunks, may be accessed from a list of potential places listed in a SR chain stored in a packet.

A network that essentially behaves globally as a dynamic CDN allows CDN to effectively provide core functionality in the network. A packet may include a Content Identifier (CID) of a chunk that a client device wishes to obtain, and may also include addresses of endpoints which are to effectively be asked for the chunk. When such a packet arrives in a network that behaves globally as a dynamic CDN, the network may use the information included in the packet to identify the chunk that the client device wishes to obtain. Once the client device obtains a video description of the chunk it wishes to obtain, the client device may fetch the chunk. In other words, once a client device obtains a video description, the client device may begin playing video by fetching a first chunk from a list that represents video content desired by the client device. In one embodiment, when a video is divided or chopped into individual chunks, the individual chunks may be described as individual entries, as for example in a DASH manifest. It should be appreciated that video chunks may be referenced in other ways, and are not limited to being described in a DASH manifest.

When a device fetches or otherwise obtains a chunk, e.g., a first chunk from a list representing any suitable content such as video content, rather than opening a TCP connection towards a particular server such as an HTTP server, the device may send a packet with a segment routing header that is populated with a list of addresses attached to a chunk entry from a description such as a video description. The packet may then be sent along a path, or along segments in a path. If an endpoint, e.g., a router, along the path traversed by the packet determines that it has the chunk requested by the device, the endpoint may terminate traffic and send or otherwise provide the requested chunk to the device.

An endpoint, as for example a router within a network, may be configured to determine when it has a chunk requested by a device and also configured to provide the requested chunk to the device. Such an endpoint is typically arranged to intercept and to interpret a packet provided by the device. That is, a router may intercept and interpret a packet obtained from a device to ascertain whether the router has a chunk requested in the packet. Such a router may generally identify a requested chunk using any suitable method. One suitable method involves utilizing an address from a list of segments provided in a SR header of a packet. In one embodiment, a last address included in a segment list in a SR header of a packet may be considered to be an actual CID, e.g., an actual V6 Content Descriptor (v6CD).

FIG. 1 is a diagrammatic representation of a network in which segment routing may be used to access chunks of content, e.g., video, in accordance with an embodiment. A network 100, which may behave as a dynamic CDN, includes device 104 and a plurality of endpoints 108a, 108b. Device 104, which may be any suitable device that is used to obtain and to play content such as video, may communicate with endpoints 108a, 108b through segments 112a, 112b. Endpoints 108a, 108b may be servers configured to store content such as video content or video chunks.

It should be appreciated that a segment 112a, 112b may be a SR segment, and may traverse or contain regular V6 routers (not shown) as well as substantially standard SR routers (not shown) that are typically not capable of delivering content. That is, segments 112a, 112b may include multiple routers (not shown). It should also be appreciated that a router (not shown) may be configured to address multiple endpoints 108a, 108b.

At a time t1, device 104 may obtain a video description. The video description may be obtained in response to a request for a description of the video. A set of addresses may be attached to a chunk entry in the video description. Upon obtaining the video description, device 104 may provide a packet 116 that requests at least one chunk of the video at a time t2. Packet 116 may be provided to endpoint 108a via segment 112a.

Once packet 116 is obtained by endpoint 108a, endpoint 108a ascertains at a time t3 whether endpoint 108a contains a chunk of video requested in packet 116. In the described embodiment, endpoint 108a determines that endpoint 108a contains the chunk of video requested in packet 116. As such, endpoint 108a provides the chunk of video requested in packet 116 to device 104, as for example through segment 112a. In addition to providing the requested chunk to packet 116, endpoint 108a may also terminate traffic from device 104. It should be understood, however, that endpoint 108a may not necessarily terminate traffic from device 104.

Endpoint 108a may generally intercept packet 116, and interpret packet 116 to determine whether endpoint 108a has or does not have the requested chunk of video. Any suitable method and/or mechanism may be used to identify whether selected video content, or a requested chunk of video. In one embodiment, endpoint 108a may be a logical entity that may physically be a separate server hosted within a router (not shown). It should be appreciated that endpoint 108a may obtain packet 116 from segment 102a. One suitable method used to identify suitable video content involves a determination of how a v6CD is coded, and will be described below with reference to FIGS. 4A, 4B, 5A-C, and 6.

To facilitate a determination of when an endpoint such as a router has a requested chunk, the endpoint may maintain a table, e.g., a chunk table, that effectively identifies substantially all chunks that are associated with, or contained on, the endpoint. As shown in FIG. 1, endpoint 108a may maintain a chunk table 110 which is arranged to identify substantially all chunks associated with endpoint 108a. When a packet with a segment routing header that is populated with a list of addresses attached to a chunk entry from a video description arrives on an endpoint, the endpoint may perform a lookup in the chunk table using a CID obtained from the packet. When the endpoint finds a match in the chunk table, the indication is that the chunk is present on the endpoint. When the chunk is determined to be present on the endpoint, the endpoint may terminate traffic and provide the chunk to a client, or a sender of the packet.

Alternatively, if there is no match found in the chunk table, the endpoint may send the packet to the next segment in the list of addresses contained in the packet.

It should be appreciated that, in some embodiments, an endpoint may elect not to terminate traffic even if a chunk is determined to be present on the endpoint. For example, a decision as to whether to terminate traffic when a chunk is determined to be present on an endpoint may be based upon the current workload of the endpoint. In general, a decision on whether to terminate traffic upon determining that a chunk is present on an endpoint may be based on, but is not limited to being based on, different implementation and/or operational considerations.

Figure 7:
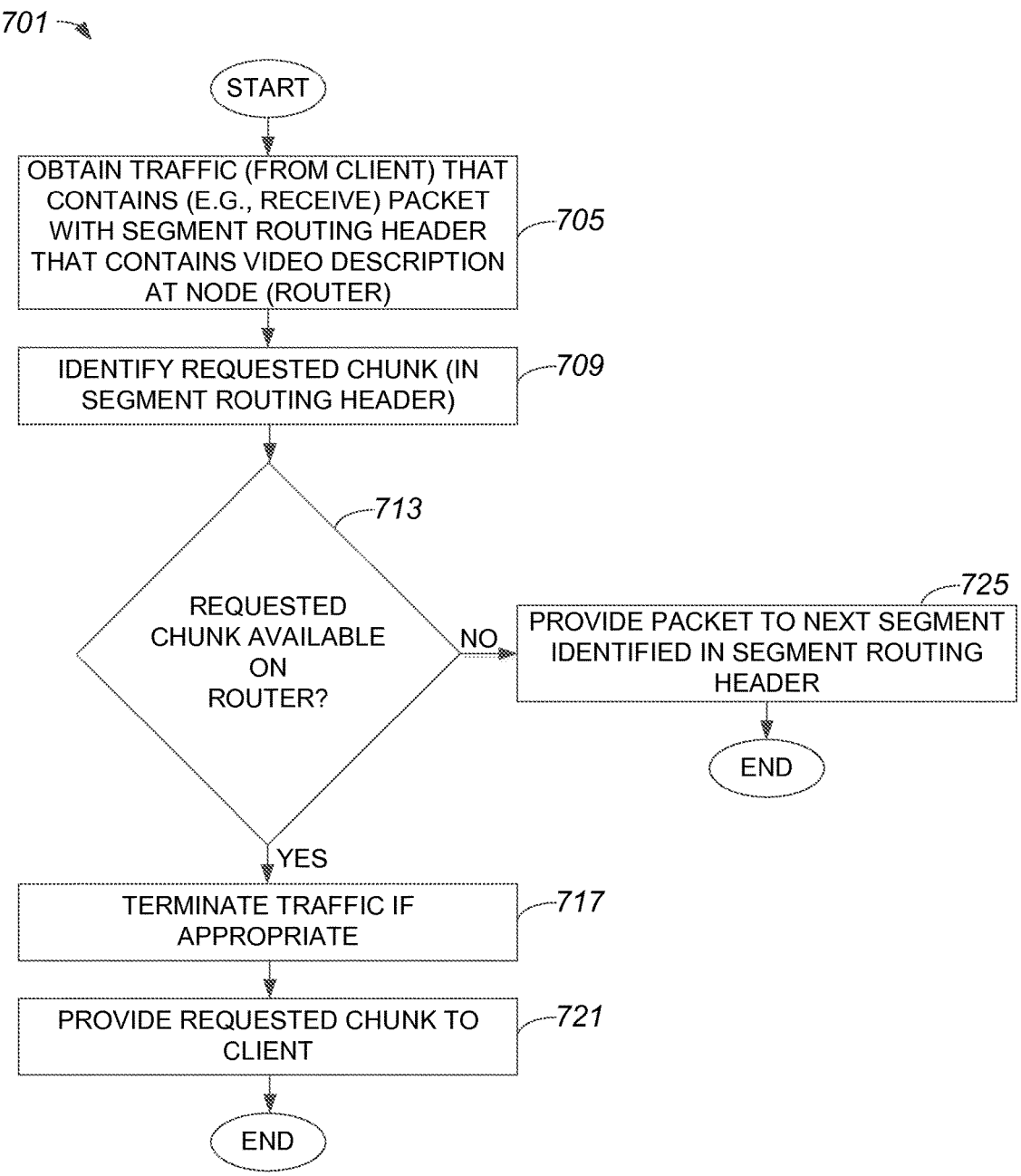
FIG. 7 is a process flow diagram which illustrates a method of using segment routing to provide a requested chunk of content to a requestor in accordance with an embodiment.

Referring next to FIG. 7, a method of using segment routing to provide a requested chunk of content to a requestor will be described in accordance with an embodiment. A method 701 of using segment routing to provide a requested chunk of content to a requestor begins at step 705 in which a node, e.g., a router within a network, obtains traffic from a client through the network. Included in the traffic is a packet which has a segment routing header that contains a video description.

In step 709, the node identifies a requested chunk using information contained in the segment routing header. As discussed above, the last address in a segment routing list contained in the segment routing header may identify by requested chunk. In one embodiment, the last address in the segment list may be the actual v6CD associated with the requested chunk.

A determination is made in step 713 as to whether the requested chunk is available on the router. Measures used to determine whether a requested chunk is available on a router may vary. In one embodiment, the router may maintain a chunk table, and may perform a lookup using the last address in the segment routing list and the chunk table that is accessible to the router. If the last address in the segment routing list corresponds to an entry in the chunk table, the indication is that the chunk is available on the endpoint, i.e., that the chunk is present on the endpoint.

If the determination in step 713 is that the requested chunk is available on the router, then process flow proceeds to step 717 in which the router terminates the traffic, if appropriate. A router may determine that it is appropriate to terminate the traffic based on any number of different factors including, but not limited to including, the current workload of the router. Upon terminating the traffic if appropriate, the router, via a logical server entity, provides the requested chunk to the client in step 721, and the method of providing a requested chunk to a client is completed.

Alternatively, if it is determined in step 713 that the requested chunk is not available on the router, the implication is that the requested chunk may be available on another router in the network. Accordingly, process flow moves from step 713 to step 725 in which the packet is provided to the next segment identified in the segment routing header or, more specifically, in the segment routing list contained in the segment routing header. Once the packet is provided, e.g., sent, to the next identified segment, the method of providing a requested chunk to a client is completed.

When an endpoint is a router, the router may be a virtual router or otherwise co-located with a content server. When a router is a virtual router or otherwise co-located with a content server, traditional application level protocols such as HTTP may not be required. A system may accommodate and leverage existing application level protocols, or may deliver video at an IP level substantially without requiring additional application protocols. As such, overhead in an overall system may be reduced. By way of example, a traditional router may implement a micro-webserver that effectively knows how to respond to an HTTP GET with an intended DASH manifest containing an SR list. A DASH manifest which contains a segment routing list, or segment routing information in general, is described in co-pending U.S. patent application Ser. No. 14/640,547, entitled "Segment Routing Support in MPEG DASH," filed on even date, which is incorporated herein by reference in its entirety for all purposes.

Figure 2:
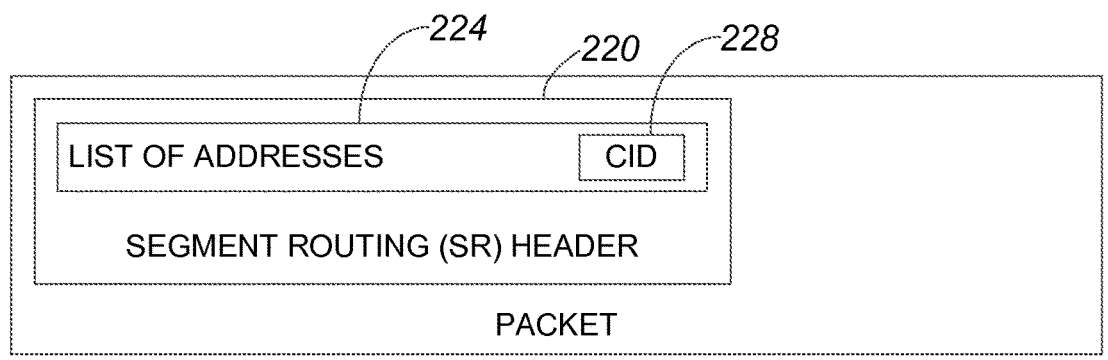
FIG. 2 is a diagrammatic representation of a packet with a segment routing header that contains a list of addresses corresponding to where a chunk may be stored in accordance with an embodiment.

FIG. 2 is a diagrammatic representation of a packet with a segment routing header that contains a list of addresses corresponding to where a chunk may be stored in accordance with an embodiment. A packet 216, which is arranged to be provided by a client and intercepted by an endpoint or router, includes a segment routing (SR) header 220. SR header 220 includes a list of addresses 224, or a segment list. List of addresses 224 effectively specifies a path through which packet 216 may travel, and includes addresses attached to a chunk entry from a video description obtained by the client prior to generating packet 216. A last address in list of addresses 224 may be a CID 228. CID 228 may be associated with a chunk that the client wishes to obtain, and the remaining addresses in list of addresses 224 effectively identify endpoints, or routers, that may be asked for the chunk.

In one embodiment, CID 228 may be an IPv6 address that includes up to approximately 128 bits. That is, IPv6 address bits may be used as content descriptors. The use of IPv6 address bits as content descriptors will be discussed below with respect to FIGS. 4A, 4B, 5A-C, and 6. The bits included in an IPv6 address may identify content, e.g., video or audio content, and may also identify properties including, but not limited to including, information relating to format, information relating to quality, information relating to compression, and/or information relating to content origin. Information relating to format may include, but is not limited to including, an aspect ratio, a resolution, a frame rate, a sampling, a depth, a container, and/or a codec. Information relating to quality may include, but is not limited to including, bandwidth information. Information relating to content origin may be, in one embodiment, associated with a TV context and may effectively specify a channel, a program, a year, a month, and/or a timecode.

The allocation of the bits of an IPv6 address may vary widely. In one embodiment, video properties may be coded on approximately ten bits, audio properties may be coded on approximately seven bits, compression properties may be coded on approximately eleven bits, versions and quality information may be coded on approximately ten bits, and the remaining twenty eight bits may contain any suitable additional characteristics. It should be appreciated, however, that the allocation of bits of an IPv6 address may vary widely and is not limited to the described embodiment. In the described embodiment, the bits allocated to video properties may be such that three bits are used to specify an aspect ratio, four bits are used to specify a resolution, and three bits are used to specify a frame rate. The bits allocated to audio properties may be such that two bits are allocated for sampling, two bits are allocated for depth, and three bits are allocated for a number of channels. The bits allocated for the compression of video and audio may be such that approximately seven bits are allocated for a video container and a codec, e.g., four bits for the video container and three bits for the codec, while approximately four bits are allocated for an audio container and a codec, e.g., two bits for the audio container and two bits for the codec. The bits allocated for versions and quality may be such that five bits are allocated for languages and subtitles, while five bits are allocated for bandwidth. It should be appreciated that the allocations of bits may vary, and the embodiment described above may not necessarily be the allocation of bits in a v6CD which will be discussed below. In other words, the allocation of bits may vary.

Figure 3:
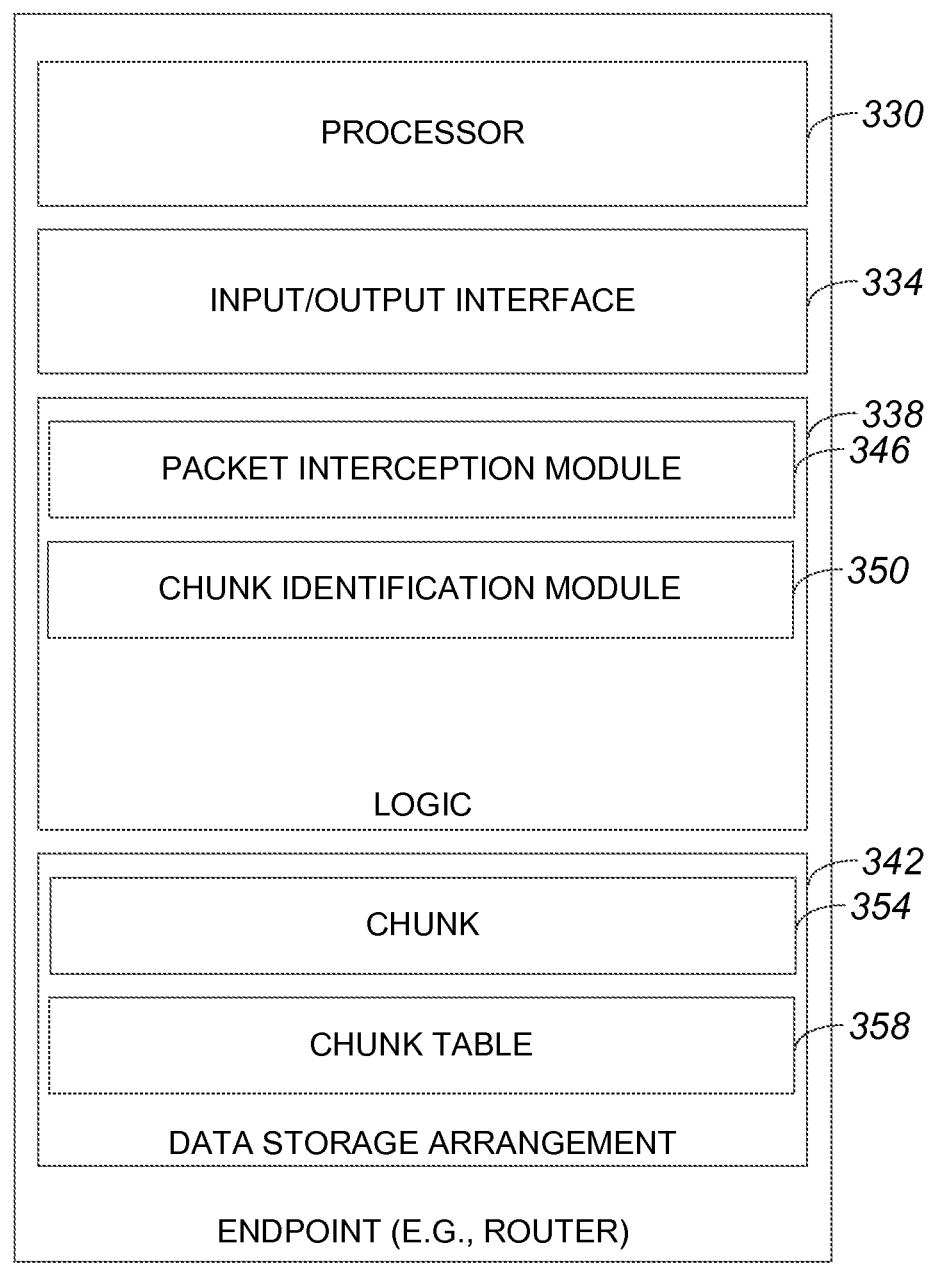
FIG. 3 is a diagrammatic representation of a network node or network endpoint, e.g., a router, in accordance with an embodiment.

With reference to FIG. 3, one embodiment of a node or an endpoint suitable for supporting segment routing will be described. A node or an endpoint 308, which may be a router in one embodiment, includes a processor 330, an input/output (I/O) interface 334, logic 338, and a data storage arrangement 342. Processor 330 is arranged to execute software logic included in logic 338. I/O interface 334 allows endpoint 308 to communicate in a network, e.g., to obtain packets from and to provide chunks to a client or a device.

Logic 338 includes a packet interception module 346 and a chunk identification module 350. Packet interception module 346 is arranged to intercept packets that represent requests for chunks. Chunk identification module 350 is arranged to determine whether a chunk that is requested in a packet is stored or cached by endpoint 308.

Data storage arrangement 342, which may be a database, is arranged to store at least one chunk 354 and a chunk table 358. Chunk table 358 may identify substantially all chunks 354 stored in data storage arrangement 342. In one embodiment, a CID contained in a packet may be used by chunk identification module 350 to search chunk table 358 to determine whether a chunk corresponding to the CID is stored in data storage arrangement 342.

Figure 4A:
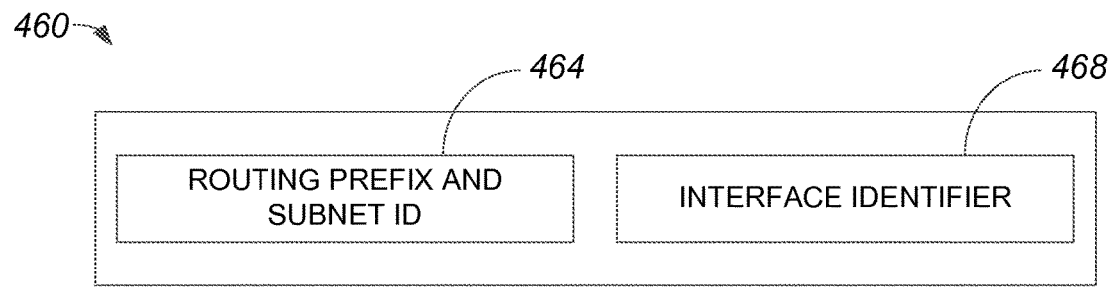
FIG. 4A is a diagrammatic representation of an IPv6 address in accordance with an embodiment.

As mentioned above, any suitable method may generally be used to identify a requested chunk such as selected video content. In one embodiment, a last address, e.g., a last IPv6 address, in a segment list in a segment routing header may be identified as an actual v6CD. FIG. 4A is a diagrammatic representation of an IPv6 address that may be part of a segment list in a segment routing header in accordance with an embodiment. An IPv6 address 460 may include bits, e.g., 128 bits, substantially divided into a routing prefix and subnet identifier (ID) 464 and an interface identifier 468. In one embodiment, routing prefix and subnet ID 464 includes approximately 64-bits, and interface identifier 468 includes approximately 64-bits. An overall content description may be included in, e.g., coded in, interface identifier 468.

Interface identifier 468 will be described with respect to FIG. 4B in accordance with an embodiment. Interface identifier 468 may include, as shown, a stream type 470a, a service identifier (ID) 470b, a content descriptor 470c, and a chunk descriptor 470d. It should be appreciated that the number of bits included in interface identifier 468 may vary widely, and the number of bits allocated to stream type 470a, service ID 470b, content descriptor 479c, and chunk descriptor 470d may also vary widely, By way of example, interface identifier 468 may include approximately 64-bits, while stream type 470a may include 2-bits, service ID 470b may include 12-bits, content descriptor 470c may include 26-bits, and chunk descriptor 470d may include 24-bits.

Stream type 470a may describe a type of stream, e.g., a type of video stream. Types of streams may generally include, but are not limited to including, linear content such as television or live video content, non-linear content such as video-on-demand, user generated content (UGC), and corporate audio/visual content such as telepresence content.

Service ID 470b may identify service from any source, as for example a provider, an operator, and/or a channel. It should be understood that each source may generally have more than one service ID 470b. In one embodiment, when service ID 470b includes 12-bits, there may be up to approximately 4096 values for service ID 470b that correspond to each stream type 470a.

Content descriptor 470c may generally allow for the management and the identification of content associated with each value of service ID 470b. Examples of a suitable content descriptor 470c will be discussed below with respect to FIGS. 5A-C. Chunk descriptor 470d is arranged to describe naming conventions for segments which make up, e.g., constitute, content such as a chunk of video. As will be understood by those skilled in the art, chunk descriptor 470d describes naming conventions for segments which make up content. In general, chunk descriptor 470d also facilitates the implementation of caching strategies such as automatic predictive caching. Chunk descriptor 470d may have approximately the same structure as content descriptor 470c, although chunk descriptor 470d and content descriptor 470c generally include different, substantially independent, information. One example of a suitable content descriptor 470c will be described below with reference to FIG. 6.

Figure 5A:
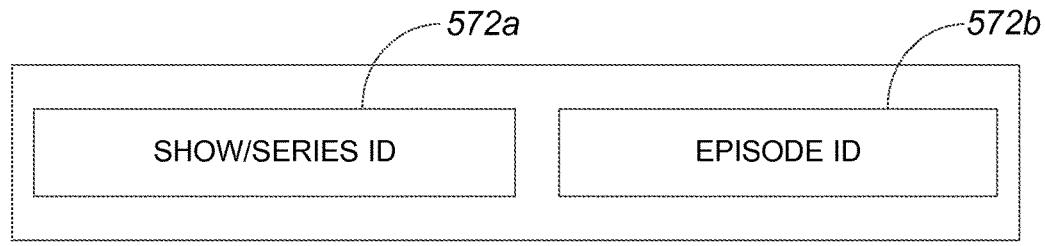
FIG. 5A is a diagrammatic representation of a first suitable content description, e.g., content descriptor 470c of FIG. 4B, in accordance with an embodiment.
Figure 5B:
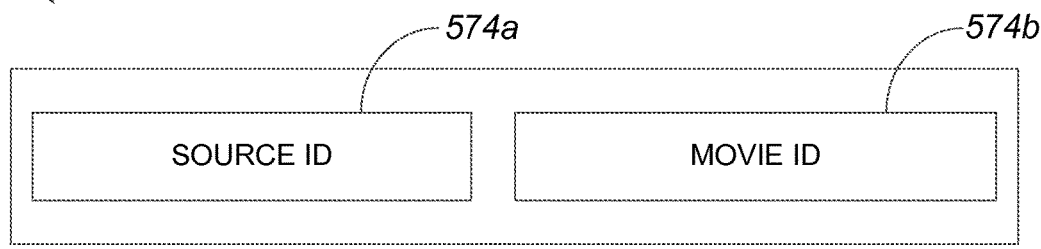
FIG. 5B is a diagrammatic representation of a second suitable content description, e.g., content descriptor 470c of FIG. 4B, in accordance with an embodiment.
Figure 5C:
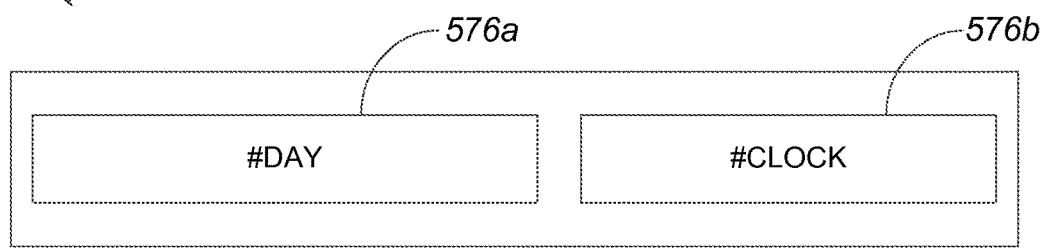
FIG. 5C is a diagrammatic representation of a third suitable content description, e.g., content descriptor 470c of FIG. 4B, in accordance with an embodiment.

Referring next to FIGS. 5A-C, examples of suitable content descriptors 470c will be described. Using IPv6 address bits as a content descriptor effectively exposes significant properties of content to lower level layers of a network, and may also facilitate the implementation of caching strategies such as automatic predictive caching.

Figure 4B:
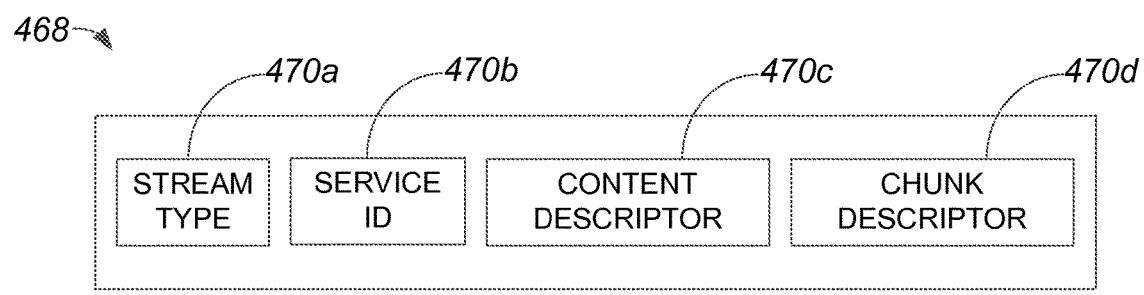
FIG. 4B is a diagrammatic representation of an interface identifier, e.g., interface identifier 468 of FIG. 4A, in accordance with an embodiment.

FIG. 5A is a diagrammatic representation of a first suitable content description, e.g., content descriptor 470c' of FIG. 4B, in accordance with an embodiment. When content is associated with shows or series associated with a service or channel ID, bits of a first content descriptor 470c' may include a show or series identifier (ID) 572a and an episode ID 572b. The number of bits associated with show or series ID 572a and episode ID 572b may vary widely. In one embodiment, show or series ID 572a may include approximately 16-bits and episode ID 572b may include approximately 10-bits.

When content is associated with movies, a content descriptor 470c" may include a source identifier (ID) 574a and a movie identifier (ID) 574b, as shown in FIG. 5B. In one embodiment, source ID 574 may include approximately 12-bits and movie ID may include approximately 14-bits.

FIG. 5C is a diagrammatic representation of a third suitable content descriptor in accordance with an embodiment. A content descriptor 470c'" may be suitable for managing a flow per minute in a day. Content descriptor 470e" may include a #day 576a and a #clock 576b. #day 576a identifies a number of days starting from a fixed date, e.g., a conventional fixed date, and #clock 576b identifies a time. In the described embodiment, #day 576a includes approximately 15-bits and #clock 576b includes approximately 11-bits. As #day 576a generally identifies a number of days starting from a fixed date, #day 576a effectively enables an actual date to be determined.

Figure 6:
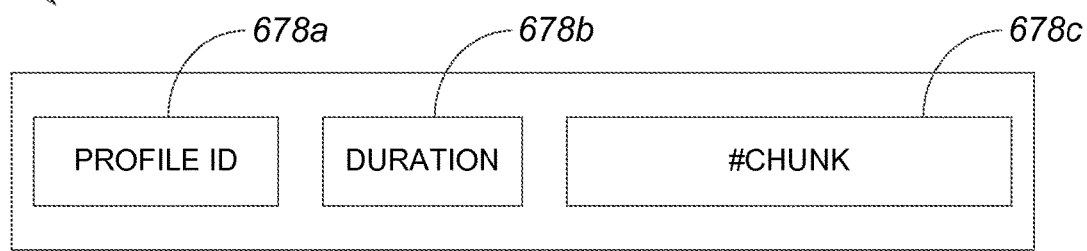
FIG. 6 is a diagrammatic representation of a chunk descriptor, e.g., chunk descriptor 470d of FIG. 4B, in accordance with an embodiment.

With reference to FIG. 6, a chunk descriptor, e.g., chunk descriptor 470d of FIG. 4B, will be described in accordance with an embodiment. A chunk descriptor 470d may have approximately 24-bits, and may include a profile identifier (ID) 678a, a duration 678b, and a sequence number of a chunk 678, or #chunk 678c. Profile ID 678a may be an identifier which effectively qualifies a quality of content and targeted playback devices. That is, profile ID 678a may include playout information associated with formats, qualities, and the like. It should be appreciated that profile ID 678a may have a particular value, as for example "0", which is arranged to indicate an unknown profile.

Duration 678b may specify a chunk duration. Such a chunk duration may be in a range of between approximately one second and approximately fifteen seconds. It should be appreciated that duration 678b may have a particular value, as for example "0", which is arranged to indicate that no duration information is provided in chunk descriptor 470d. The inclusion of a sequence number of a chunk, or #chunk 678c, allows iterations to be used to fetch or to cache the chunk. For example, if a client requests a particular chunk that represents video, the client will generally likely also request the next sequential chunk and so forth. As such, predictability may allow a caching mechanism to effectively push the next sequential chunks in advance. Hence, chunk consumption may be anticipated and leveraged to optimize global caching efficiency.

As mentioned above, a CID may be a last address in a list of addresses or segment routing list contained in a segment routing header of a packet. A CID may generally have any suitable format. In general, a CID may be an IPv6 address in which content information is coded. The content information may include, but is not limited to including, a format, a resolution, a quality, and/or a time code. It should be appreciated that CID information coding may vary widely, and may depend upon factors including, but not limited to including, requirements of a service provider and/or requirements of a network operator.

When chunks become available to client devices, the indication may be that the chunks have previously been pushed against different network nodes or endpoints, e.g., routers. Segment routing information, e.g., a segment routing header of a packet, may contain information regarding a potential location of a chunk, as discussed above. That is, in lieu of containing addresses which indicate where a chunk may be delivered from, a segment routing header may include a list of addresses corresponding to a location at which a chunk may be stored or cached. In one embodiment, a first address in a segment list may be arranged to identify content that may be stored by a node which receives the segment list, and may be identified by a v6CD represented by the first address. Using a first address in a segment list to identify content that may be stored by a node which receives a segment list is effectively a generalization of SR usage in a distributed caching system. In some instances, an SR list may integrate endpoint addresses at which chunks may be stored rather than delivering the chunks.

Each endpoint in a chain may store content, e.g., content identified by a CID represented by a last address in a segment list or list of addresses. Various factors may be considered in determining whether an endpoint stores a chunk. Each endpoint in a chain, however, generally propagates a request to a next hop in a list of addresses such that the same chunk may potentially be stored at different locations.

Chunks, e.g., video chunks, may include additional attribute information such as a time to live (TTL) for each cached version of a chunk. As will be appreciated by those skilled in the art, a '0' value may indicate a substantially infinite TTL. At least some attributes may be defined for each node described in a list of addresses or a segment routing list, e.g., the list of addresses shown in FIG. 2. Each node identified in the list of addresses or segment routing list may use the defined attributes to manage its local content cache. In one embodiment, the attributes may be used dynamically by a network to effectively automatically re-push chunks which are under a relatively high demand from nodes that have the chunks in their local content caches against nodes from which the chunks have already disappeared, e.g., disappeared due to expired TTLs. As such, relatively high frequency network automatic adaptation to video traffic may be achieved. An endpoint or a node that triggers a re-push operation may use an SR list present in an incoming packet to identify a node on which a chunk may be re-cached.

Multiple IPs may be pushed to a host or a client in a manner that may be used by an IP stack. Pushing multiple IPs to a host may enable the host to become increasingly multi-homed and dynamic.

In one embodiment, a network may return a chunk description as a segment routing list based upon the current state of a routing system. That is, segment routing information may be dynamically elaborated based on current network status. The presence of a chunk description as a segment routing list is particularly useful if a router is a virtual router or otherwise co-located with server content, or if a traditional router implements a micro-web server. In addition, the presence of a chunk description as a segment routing list may allow more information to be obtained out of a DNS, and return information may be better utilized by a host that knows how to contact multiple destinations at a time.

IPv6 segment routing may be used for regional licensing and for building path-aware geo-location into a routing system. As such, content may be served based on where content is located, and also based on the paths traversed by content, with an ability to dynamically reroute content intact while crossing political and/or geographical boundaries.

As will be appreciated by those skilled in the art, segment routing and other in-the-network approaches to video streamlining substantially eliminate location-dependence from a protocol operation, and also allows multi-path and multi-destination routing substantially without the need for DNS lookups, load balancers, and/or proxies.

The use of segment routing may allow for one connection to be opened from a client to a server such that a network may access chunks. The use of segment routing may allow existing content cryptography, key management, and Digital Rights Management (DRM) to be used substantially unchanged, or with minimal changes, if there is a desire to use segment routing for key distribution as well as confidentiality. When combined with segment routing-style caching, it may not be necessary to transfer custody of an asset to network nodes or endpoints, as video integrity may be provided end-to-end using built-in mechanisms. Similarly, network nodes or endpoints may not need to be in possession of content encryption keys in order to effectively deliver data to clients.

The use of segment routing provides an elegant method for delivering content such as video. The use of segment routing is such that substantially only one connection needs to be opened, and a network itself may handle the process of accessing chunks. For example, an existing CDN video infrastructure and application levels standards may be tied into an IPv6 segment routing infrastructure. In one embodiment, CDN may effectively be replaced by a combination of a client device software stack, thereby leveraging on segment routing kernel support and technological advances that routers which support segment routing may provide.

Although only a few embodiments have been described in this disclosure, it should be understood that the disclosure may be embodied in many other specific forms without departing from the spirit or the scope of the present disclosure. By way of example, while DASH may be used to provide a client or a device requesting video with segment routing information, other methods and protocols may be used to provide segment routing information to a client or a device.

The present disclosure has been described in the context of IPv6. It should be appreciated that the present disclosure is not limited to being used in the context of IPv6, and that the present invention may be applied to other Internet Protocols.

It should be appreciated that methods of the disclosure may be applied to any suitable content. Suitable content may include, but is not limited to including, video content, AV content, and/or classified traffic and policy. As such, an SR header in a packet may be used to effectively express an intent relating to data that may be obtained and followed by a network. Traffic may be classified by a network, or by an application. In one embodiment, instances of applications may effectively be classified as types of content.

A CID has generally been described as identifying a chunk. In one embodiment, a CID may be a V6CD.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
    obtaining a packet at a network endpoint, the packet being obtained from a client via a first segment, the packet having a segment routing header, the segment routing header including a list of addresses attached to a chunk entry, wherein the packet is configured to identify at least a first chunk requested by the client, wherein the list of addresses includes a plurality of addresses, and wherein a first chunk address corresponding to the at least first chunk is a last address included in the list of addresses, the last address being a V6 content descriptor (v6CD) that identifies the first chunk, and wherein other addresses in the list of addresses identify endpoints that may be asked for the first chunk;
    identifying, at the network endpoint, the at least first chunk using the packet;
    determining at the network endpoint if the network endpoint has the first chunk;
    providing the first chunk from the network endpoint to the client if it is determined that the network endpoint has the first chunk; and
    providing the packet to at least a second segment if it is determined that the network endpoint does not have the first chunk.

2. The method of claim 1 wherein the first chunk is a chunk of video, and wherein the segment routing header is configured to identify at least the first chunk requested by the client.

3. The method of claim 1 wherein the first chunk is a chunk of audio.

4. The method of claim 1 wherein the packet is included in traffic, and wherein the method further includes:
    terminating the traffic if it is determined that the network endpoint has the first chunk.

5. A tangible, non-transitory computer-readable medium comprising computer program code, the computer program code, when executed, configured to:
    obtain a packet at a network endpoint, the packet being obtained from a client via a first segment, the packet having a segment routing header, the segment routing header including a list of addresses attached to a chunk entry, the list of addresses including a plurality of addresses, wherein the packet is configured to identify at least a first chunk requested by the client, wherein a first chunk address corresponding to the at least first chunk is a last address included in the list of addresses, the computer program code configured to identify the at least first chunk using the packet being further configured to obtain the first chunk address from the list of addresses, wherein the last address is a V6 content descriptor (v6CD) that identifies the first chunk, and wherein other addresses in the list of addresses identify endpoints that may be asked for the first chunk;
    identify, at the network endpoint, the at least first chunk using the packet;
    determine at the network endpoint if the network endpoint has the first chunk;
    provide the first chunk from the network endpoint to the client if it is determined that the network endpoint has the first chunk; and
    provide the packet to at least a second segment if it is determined that the network endpoint does not have the first chunk.

6. The tangible, non-transitory computer-readable medium of claim 5 wherein the first chunk is a chunk of video, and wherein the segment routing header is configured to identify at least the first chunk requested by the client.

7. The tangible, non-transitory computer-readable medium of claim 5 wherein the first chunk is a chunk of audio.

8. The tangible, non-transitory computer-readable medium of claim 5 wherein the packet is included in traffic, and wherein the computer program code is further configured to:
    terminate the traffic if it is determined that the network endpoint has the first chunk.

9. An apparatus comprising:
    a processor;
    a data storage arrangement, the data storage arrangement configured to store a set of chunks;
    an input/output (I/O) interface, the I/O interface arranged to obtain a packet from a client via a first network segment, the packet including a segment routing header having a list of addresses including a first chunk address arranged to identify a first chunk requested by the client; and logic arranged to be executed by the processor, the logic being configured to identify the first chunk using the packet and to determine if the first chunk is included in the set of chunks, wherein the logic is further configured to provide the first chunk to the client if it is determined that the first chunk is included in the set of chunks and to cause the I/O interface to provide the packet to at least a second segment if it is determined that the first chunk is not included in the set of chunks, wherein the first chunk address is a last address included in the list of addresses, the list of addresses including a plurality of addresses, the last address being a V6 content descriptor (v6CD) that identifies the first chunk, and wherein other addresses in the list of addresses identify endpoints that may be asked for the first chunk.

10. A method comprising:

obtaining a packet at a network endpoint, the packet being obtained from a client via a first segment, the packet having a segment routing header, the segment routing header including a list of addresses attached to a chunk entry, wherein the packet is configured to identify at least a first chunk requested by the client, wherein the first chunk is a chunk of video, and wherein the segment routing header is configured to identify at least the first chunk requested by the client;

identifying, at the network endpoint, the at least first chunk using the packet;

determining at the network endpoint if the network endpoint has the first chunk;

providing the first chunk from the network endpoint to the client if it is determined that the network endpoint has the first chunk; and providing the packet to at least a second segment if it is determined that the network endpoint does not have the first chunk, wherein the list of addresses includes a plurality of addresses, and wherein a last address in the list of addresses is a content identifier corresponding to the at least first chunk, the CID being an address in which content information is included, the content information including at least one selected from a group including a format, a resolution, a quality, and a time code.

\* \* \* \* \*